United States Patent [19]

Ishida et al.

[11] Patent Number: 4,876,563
[45] Date of Patent: Oct. 24, 1989

[54] MOTOR-DRIVEN SHUTTER FOR CAMERA

[75] Inventors: Hiroaki Ishida; Nobuo Shinozaki; Michitake Nakazawa, all of Tokyo, Japan

[73] Assignee: Seikosha Co., Ltd., Japan

[21] Appl. No.: 172,078

[22] Filed: Mar. 23, 1988

[30] Foreign Application Priority Data

Mar. 23, 1987 [JP] Japan .................................. 62-68354

[51] Int. Cl.4 .......................... G03B 3/10; G03B 9/24; G03B 17/00
[52] U.S. Cl. ................................ 354/234.1; 354/253; 354/288
[58] Field of Search ...................... 354/234.1, 253, 288

[56] References Cited

U.S. PATENT DOCUMENTS 4,721,972  1/1988  Wakabashi .................. 354/234.1 X Primary Examiner—Michael L. Gellner
Attorney, Agent, or Firm—Bruce L. Adams; Van C. Wilks

[57] ABSTRACT

A motor-driven shutter mechanism is provided with a lens protecting mechanism to protect the lens of a camera. The lens protecting mechanism consists of one or more lens guard members movable back and forth upon operation of the camera's motor-driven focussing and aperture setting mechanism to cover and uncover the lens. The lens guards are operably interconnected with the same motor which controls the focussing and aperture setting operations of the camera.

17 Claims, 4 Drawing Sheets

MOTOR-DRIVEN SHUTTER FOR CAMERA

FIELD OF THE INVENTION

The present invention relates to a motor-driven shutter for a camera, and particularly to a camera shutter suitable for a camera provided with a barrier mechanism.

BACKGROUND OF THE INVENTION

Various types of cameras have recently been proposed which are provided with a barrier mechanism on the front of a photographic lens for the purpose of protecting it. However, they have a disadvantage with respect to operational properties because such a barrier portion is generally independent and is manually driven before and after a photograph is taken.

In order to remove the above-described disadvantage, a method has been considered in which a motor exclusively used for driving a barrier is provided so as to automatically drive the barrier with an interlocking release. However, this method has the disadvantage in that many component parts are required and thus the size and cost of a camera are increased. In addition, in a camera having a lens with two or more focal points such as a telephoto lens or wide angle lens, this method has a disadvantage in that a shutter is moved in the direction of an optical axis and thus any interlocking mechanism provided between a barrier portion and a body portion necessarily becomes complicated.

In a camera having separate motors used respectively for driving a lens and a barrier, the driving of the barrier in the driving range of the lens consumes an excessive amount of current and thus causes an increase in the cost of the associated power circuit or motor-driven circuit.

The present invention has been achieved with a view to solving the above-described disadvantages, and it is an object of the present invention to provide a motor-driven shutter for a camera having a barrier which is driven without the need for a separate motor to be provided for the barrier.

SUMMARY OF THE INVENTION

To achieve the foregoing and other objects, the present invention provides a motor-driven shutter for a camera which comprises barriers for covering the front of a lens before and after the shutter is operated and a motor for operating the lens for the purpose of focussing, characterized in that means are provided so that the barriers are driven by the same motor as that utilized for operating the lens.

BRIEF DESCRIPTION OF THE PREFERRED EMBODIMENTS

Figure 1:
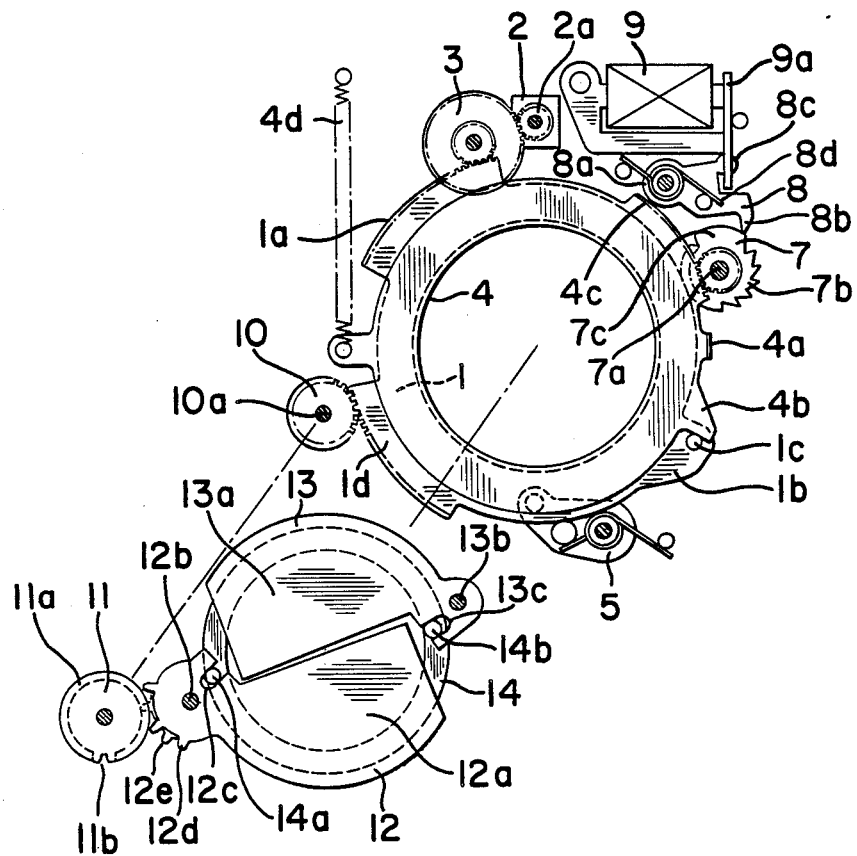
FIG. 1 is a schematic diagram in cross section of an apparatus of a first embodiment of the present invention.

The present invention is described in detail below with reference to the embodiments shown in the drawings.

Figure 2:
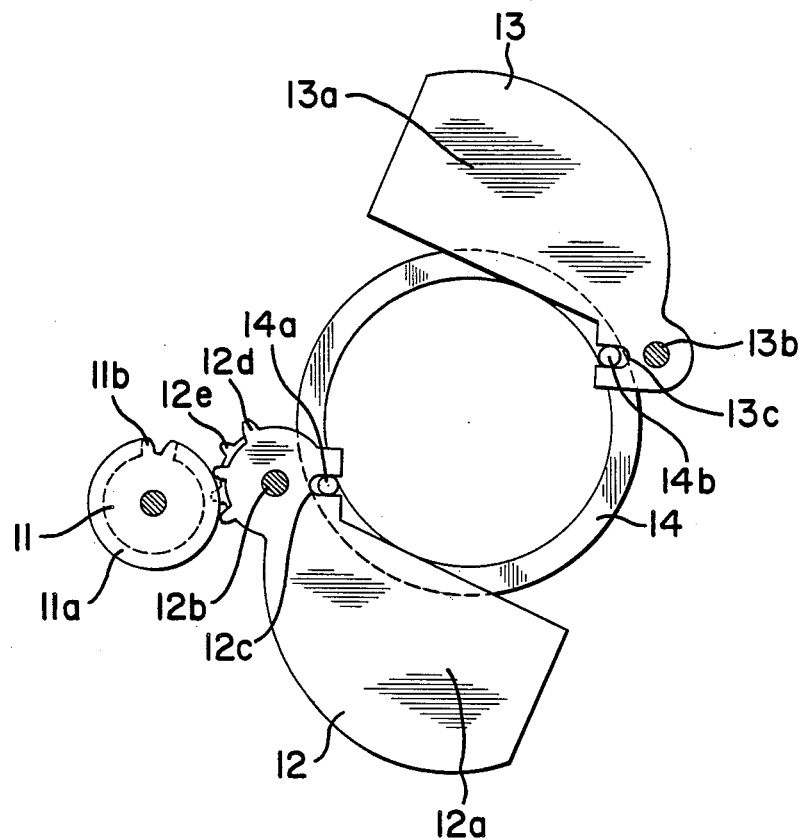
FIG. 2 is a schematic diagram in cross section of a portion of the apparatus of FIG. 1 in a state wherein the barriers are open.

FIGS. 1 and 2 show a first embodiment of the present invention, FIG. 1 being a diagram of a stepping motor-driven shutter in the state before release and FIG. 2 being a diagram showing lens of barriers in an open state.

In the drawings, reference numeral 1 denotes a drive ring used as a drive member which is so provided as to be rotatable around a lens aperture (not shown), and which has a sector gear 1a connected by way of a gear through an idler 3 to a rotor gear 2a provided on the output shaft of a known stepping motor 2. The drive ring 1 also has a cam 1b which operates a sector driving lever 5 for driving a sector (not shown), a pin 1c which is connected to a range ring 4 described below, and a sector gear 1d which is connected by way of a gear to the connecting gear 10 described below.

The range ring 4 which serves as a range adjustment member is so provided as to be rotatable around the lens aperture in the same way as the drive ring, and has a connecting portion 4a which operates a lens (not shown), an engaging portion 4b which is related to the pin 1c of the drive ring, a sector gear 4c which is gear-connected to a ratchet wheel 7 described below, and a spring 4d which biases the range ring 4 to rotate in a clockwise direction.

The ratchet wheel 7 is rotatable suported by a pin 7a on a base (not shown) and has many teeth for focussing and positioning and a large-diameter portion 7c for setting an engagement lever 8 described below at a retracted position.

The engagement lever 8 is pivotally supported by a pin 8a on the base and has a claw 8b which engages with the teeth 7b and the large-diameter portion 7c of the ratchet wheel 7. The lever 8 has a connecting portion 8c which connects with an armature 9a attracted by energization of a solenoid 9, and a spring 8d which biases the engagement lever 8 to pivot in a clockwise direction.

The connecting gear 10 is rotatable supported by a pin 10a on the base and is gear-connected to the sector gear 1d of the drive ring 1.

An intermittent gear 11 is rotatably supported by the pin 10a on the base in the same way as the connecting gear 10, and is connected to the connecting gear 10 so as to be rotatable in synchronism therewith. The gear 11 has a disc 11a engageable with a first barrier 12 as described below and a carry tooth 11b.

The first barrier 12 is pivotally supported by a pin 12b on the base (not shown) and has a mask portion 12a for protecting the lens, thick teeth 12d engageable with the disc 11a and the carry tooth 11b of the intermittent gear 11. The barrier 12 has thin teeth 12e engageable with to the carry tooth 11b of the intermittent gear 11, and a groove 12c that slidably engages with a connecting ring 14 described below.

The connecting ring 14 is so provided as to be rotatable around the aperture of the lens in the same way as the drive ring 1 and the range ring 4. The ring 14 has a pin 14a that slidably engages with the groove 12c of the first barrier 12 and a pin 14b that slidably engages with a groove 13c of a second barrier 13 described below.

The second barrier 13 is pivotally supported by a pin 13b on the base (not shown) and has a mask portion 13a for protecting the lens in combination with the mask portion 12a of the first barrier 12. The second barrier 13 has a groove 13c with which a pin 14b of the connecting ring 14 is slidably engaged.

Figure 3:
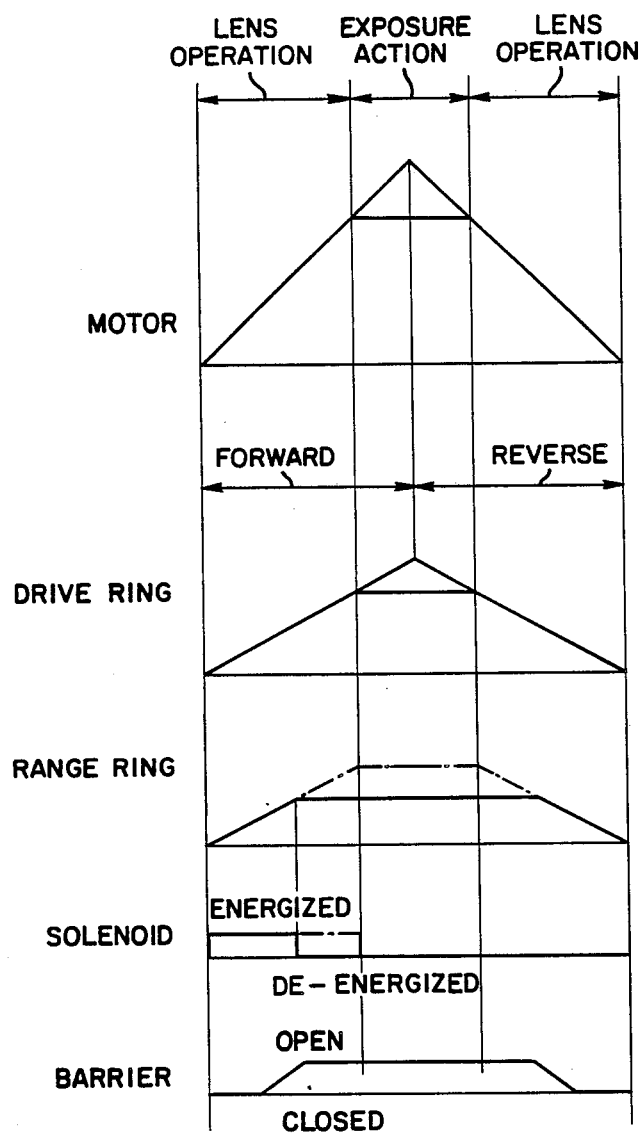
FIG. 3 is a flow diagram of operation of the first embodiment.

FIG. 3 is a diagram of the operation of the first embodiment. The stepping motor 12 operates in a forward direction in the lens operating range for focussing in accordance with the program previously set by a control circuit (not shown) The motor 12 operates in a forward and reverse direction in the range of the exposure action, and operates in a reverse direction in the lens operating range in order to return the lens. The drive ring 1 which is gear-connected to the stepping motor 2 is rotated clockwise by the forward direction of the stepping motor 2 and is rotated counterclockwise by the reverse direction thereof.

Upon clockwise rotation of the ring 1, which carries the pin 1c, the range ring 4 is rotated clockwise under the bias of the spring 4d, thereby following the drive ring 1. When the ratchet wheel 7 gear-connected to the range ring 4 is engaged with the engagement lever 8, the ring 4 is prevented from rotating. Upon counterclockwise rotation of the drive ring 1 the pin 1c and the engagement portion 4b are in contact with each other and the ring 4 is rotated counterclockwise, thereby charging the spring 4d.

In addition, the solenoid 9 is energized in the initial stage of a shutter operation and attracts the armature 9a so that the engagement lever 8 integral therewith is held at the position of the large-diameter portion 7c of the ratchet wheel 7 thereby allowing the wheel 7 to rotate. The solenoid 9 is de-energized by an output signal fom a focal point detecting circuit (not shown) so that the engagement lever 8 is pivoted in a clockwise to direction engage with the ratchet wheel 7.

On the other hand, the first barrier 12 and the second barrier 13, which is operated by the first barrier 12 through the connecting ring 14, are held in the closed state (FIG. 1) or the open state (FIG. 2) when the disc 11a of the intermittent gear 11 which is rotated integrally with the connecting gear 10, which is gear-connected to the drive ring 1, is brought into slidable contact with the thick teeth 12d of the first barrier 12. The carry tooth 11b of the intermittent gear 11 and the thick teeth 12d and the thin teeth 12e of the first barrier 12 comprise an intermittent transmitting mechanism between the first barrier and the drive ring so as to open or close the mask portions 12a and 13a by gear connection therebetween in the lens operating range.

The operation of the above-described shutter is described below.

When a release button (not shown) is operated in the state before shutter release shown in FIG. 1, a main switch is turned on and an exposure control circuit (not shown) and the focal point detecting circuit are operated so as to set an aperture value and a focal point.

The solenoid is then energized so as to hold the engagement lever 8 and the stepping motor 2 is forwarded in the open state of the ratchet wheel 7 so that the drive ring 1 and the range ring 4 are rotated clockwise.

At the previously set focal point, the solenoid 9 is de-energized and the engagement lever 8 engages the ratchet wheel 7, to stop rotation of the range ring 4 whereby the photographic lens is positioned at the focal point. The drive ring 1 is continuously rotated clockwise after the focussing action and reaches the range of exposure action. On the other hand, when the connecting gear 10 and the intermittent gear 11 are rotated counterclockwise by the clockwise rotation of the drive ring 1 in the lens operating range so as to start the gear connection between the carry tooth 11b of the intermittent gear 11 and the thick teeth 12d and the thin teeth 12e of the first barrier, the barriers in the closed state are opened and then held in the open state shown in FIG. 2 by the slidable contact between the disc 11a of the intermittent gear 11 and the thick teeth 12d of the first barrier 12.

The drive ring 1 is then rotated clockwise in the range of exposure action so as to cause the sector driving cam 1b to pivot the sector driving lever 5 counterclockwise and to cause a sector (not shown) to perform an opening action. When the previously set aperture value is obtained, the stepping motor 2 is reversed so as to rotate the drive ring 1 counterclockwise and close the sector, and the exposure action is completed.

On the other hand, although the intermittent gear 11 is continuously rotated in the range of the exposing action, the barriers are held in the open state because of the slidable contact between the disc 11a and the thick teeth 12d of the first barrier 12.

After the exposure action has been completed, the stepping motor 2 is continuously reversed so that the intermittent gear 11 that is rotated clockwise through the drive ring 1 and the connecting gear 10 rotates the first barrier 12 counterclockwise and the barriers are closed and returned to the state shown in FIG. 1.

The above-described embodiment is configured in such a manner that the barriers are opened or closed in the lens operating range, but the barriers can be opened or closed before or after the lens operating range by changing the phase relationship between the disc and the carry tooth of the intermittent gear.

A second embodiment shown in FIG. 4 using a known Geneva mechanism is described below.

Figure 4A:
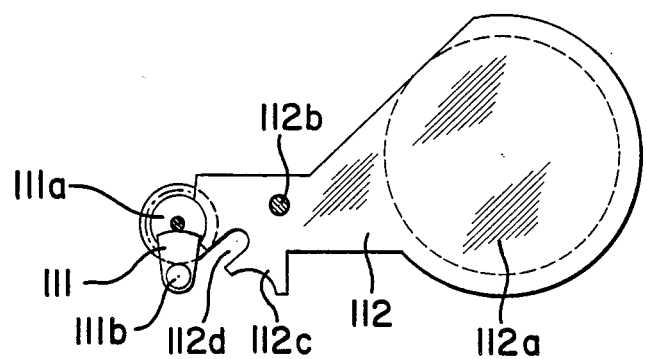
FIGS. 4(a) and 4(b) are schematic in cross section diagrams of a barrier driving apparatus of a second embodiment of the present invention.
Figure 4B:
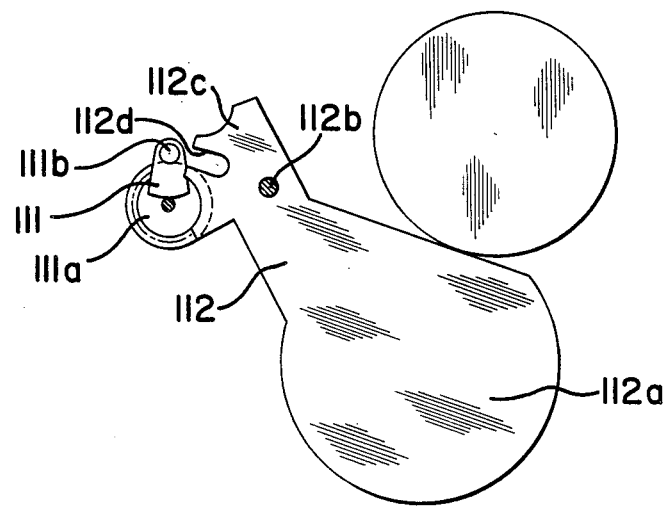

FIG. 4(a) is a diagram of a barrier driving apparatus in a state before shutter release, and FIG. 4(b) is a diagram of the same in a state wherein a barrier is open.

In the drawings, reference numeral 111 denotes an intermittent drive member having a rotational axis common with a connecting gear which is gear-connected to a drive ring (which is the same as that of the first embodiment). The drive member 111 is thereby rotatable in synchronism with the connecting gear and with a disc 111a. The drive member 111 has a pin 111b engageable with a single barrier 112, as described below.

The barrier 112 is pivotally supported by a pin 112b on a base (not shown) and has a mask portion 112a for protecting a lens, a presser portion 112c which is in slidable contact with the disc portion 111a of the intermittent drive member, and a groove 112d which slidably engages with the pin 111b of the intermittent drive member. The barrier 112 is held in the closed state (FIG. 4(a)) or the open state (FIG. 4(b)) in the state wherein the disc portion 111a of the intermittent drive member rotated through the drive ring and the connecting gear is brought into slidable contact with the presser portion 112c of the barrier. The engagement between the pin 111b of the intermittent drive member and the groove 112d of the barrier 112 provides an intermittent transmitting mechanism between the barrier and the drive ring so as to open or close the mask portion 112a.

Each of the above-described first and second embodiments is so configured that the drive member can be rotated around the lens, but the drive member can alternatively be moved linearly on the base, as described in Japanese Patent Laid-Open No. 9631/1986.

In addition, each of the first and second embodiments uses the stepping motor, but any motor which can control both forward and reverse movements, such as an ultrasonic motor or a DC motor, can be used in either embodiment.

Furthermore, in each of the embodiments, the barrier driving action comprises the gear connection between the connecting gear and the drive ring, but the connecting gear can alternatively be gear-connected to the idler or the rotor gear.

Since, as described above, the present invention comprises a single motor which performs both the barrier driving action and the lens driving action, the barrier can be automatically driven, without the need for providing a separator motor for driving the barrier, and thus attempts can be made to reduce the size and the cost. In addition, since in the present invention, the barrier is opened or closed by the shutter portion, a connecting mechanism between the barrier portion and the body portion need not be provided in a camera having a lens with two or more focal points such as a telephoto lens or a wide angle lens, and thus the number of component parts, as well as the size and cost, can be reduced. In the present invention, since the barrier can be opened or closd during operation of the lens, the time from shutter release to the start of exposure can be reduced and there is thus an advantage with respect to providing a good shutter release moment during photography.

What is claimed is:

1. A motor-driven shutter for a camera which comprises at least one barrier for covering the front surface of a lens before and after said shutter is operated and a motor for operating said shutter for the purpose of focussing, said barrier being driven by linking means which is responsive to operation of said motor.

2. A motor-driven shutter for a camera according to claim 1, which comrises a drive member movable by the motor within a lens operating range; said barrier being connected to and driven by said drive member within said lens operating range.

3. A motor-driven shutter for a camera according to claim 2, wherein said barrier is connected to said motor by means of an intermittent motion transmitting mechanism.

4. A motor-driven shutter for a camera according to claim 1, wherein said barrier is connected to said motor by means of an intermittent motion transmitting mechanism.

5. The motor-driven shutter of claim 1, in which said barrier comprises a pair of blade members movable back and forth between open and closed positions, respectively covering and uncovering the lens of the camera.

6. The motor-driven shutter of claim 5, in which said blade members are pivotally mounted on opposite sides of the lens of the camera.

7. The motor-driven shutter of claim 6, comprising a pivotally mounted link element engageable with both of said blade members, each of said blade members having a pair of opposed surfaces alternately engageable by said link element to move said blade members simultaneously back and forth between said open and closed positions.

8. The motor-driven shutter of claim 7, in which each pair of said opposed surfaces defines the side surfaces of a groove formed in one of said blade members, said link element being provided with a pair of pins, each of said pins being engageable with one of said grooves.

9. The motor-driven shutter of claim 8, in which said link element comprises a ring rotatably mounted substantially concentric with the optical axis of the camera lens, the pivot axes of said blade members being located on diametrically opposite sides of said ring.

10. The motor-driven shutter of claim 5, in which said intermittent motion transmitting mechanism comprises a pivotally moveable control element engageable with one of said blade members, one of said one blade member and said control element having a proection periodically engageable with the other.

11. The motor-driven shutter of claim 10, in which said intermittent motion transmitting mechanism comprises a Geneva mechanism.

12. An automatic shutter mechanism for a camera having a motor-driven exposure action, the mechanism comprising:
at least one lens guard movable back and forth respectively to cover and uncover the lens of the camera;
a member driven by the motor to move in one direction during the exposure action; and
means responsive to movement of said member in said one direction to move said lens guard to uncover the lens of the camera.

13. The automatic shutter mechanism of claim 12, in which said member is driven by the motor to move in a reverse direction from said one direction, and the mechanism comprises means responsive to movement of said member in said reverse direction to move said lens guard to cover the lens of the camera.

14. The automatic shutter mechanism of claim 13, in which said member comprises a rotatable ring and said responsive means comprises at least one pivotally mounted link member engageable with both said ring and said lens guard.

15. The automatic shutter mechanism of claim 14, in which said link member comprises gear means for meshing with a corresponding portion of the periphery of said ring.

16. The automatic shutter mechanism of claim 12, in which said member comprises a rotatable ring and said responsive means comprises at least one pivotally mounted link member engageable with both said ring and said lens guard.

17. The automatic shutter mechanism of claim 16, in which said link member comprises gear means for meshing with a corresponding portion of the periphery of said ring.

* * * * *